(12) United States Patent
Fisher et al.

(10) Patent No.: US 7,516,403 B1
(45) Date of Patent: Apr. 7, 2009

(54) NETWORK DISTRIBUTED DISPLAY PAGES WITH IMAGES AND SYMBOLS SELECTED FROM A UNIVERSAL LIBRARY

(75) Inventors: Jeffrey Owen Fisher, Austin, TX (US); Eddie Lambert, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1256 days.

(21) Appl. No.: 08/995,631

(22) Filed: Dec. 22, 1997

(51) Int. Cl.
*G06F 17/00* (2006.01)

(52) U.S. Cl. .................... 715/239; 715/273

(58) Field of Classification Search ............. 707/513, 707/526; 345/326, 141, 133, 116, 115; 709/200–203, 709/217; 395/701, 708, 702, 117, 114; 715/513, 715/526
See application file for complete search history.

(56) References Cited

U.S. PATENT DOCUMENTS

| | | | | |
|---|---|---|---|---|
| 5,235,680 A | * | 8/1993 | Bijnagte | 395/161 |
| 5,692,073 A | * | 11/1997 | Cass | 382/219 |
| 5,727,129 A | * | 3/1998 | Barrett et al. | 395/12 |
| 5,761,683 A | * | 6/1998 | Logan et al. | 707/513 |
| 5,819,092 A | * | 10/1998 | Ferguson et al. | 395/701 |
| 5,880,740 A | * | 3/1999 | Halliday et al. | 345/435 |

OTHER PUBLICATIONS

Oliver, et al., Netscape 2 Unleashed, Sams Net, p. 377, Feb. 1996.*
Oliver, et al., Netscape 2 Unleashed, Sams Net, p. 377, Unknown date, Feb. 1996.*

* cited by examiner

*Primary Examiner*—Alford W. Kindred
(74) *Attorney, Agent, or Firm*—Jerry B. Kraft; Justin M Dillon; Leslie A Van Leeuwan

(57) ABSTRACT

A data processor controlled user interactive display system for displaying hypertext documents, each including a sequence of display screen pages received over a communications network such as the World Wide Web. In order to reduce downloading time, Web pages are transmitted as HTML files in which images are represented by identifiers. The images corresponding to the identifiers may be fetched from libraries of universal images. The invention is implemented by the display stations which receive the Web pages. These stations, through associated browsers, retrieve the universal image libraries via the internet and download such libraries once and store them locally on caches associated with the browsers.

15 Claims, 4 Drawing Sheets

NETWORK DISTRIBUTED DISPLAY PAGES WITH IMAGES AND SYMBOLS SELECTED FROM A UNIVERSAL LIBRARY

TECHNICAL FIELD

The present invention relates to computer managed communication networks and particularly to ease of use of interactive computer controlled display interfaces to networks for substantially reducing the time and resources required to download documents with display pages into receiving network display stations.

BACKGROUND OF THE INVENTION

The 1990's decade has been marked by a societal technological revolution driven by the convergence of the data processing industry with the consumer electronics industry. Like all such revolutions, it unleashed a significant ripple effect of technological waves. The effect has in turn driven technologies which have been known and available but relatively quiescent over the years. A major one of these technologies is the internet-related distribution of documents made up of display pages such as internet World Wide Web pages which contain text and images. The convergence of the electronic entertainment and consumer industries with data processing exponentially accelerated the demand for wide ranging communications distribution channels, and the World Wide Web or internet which had quietly existed for over a generation as a loose academic and government data distribution facility reached "critical mass" and commenced a period of phenomenal expansion. With this expansion, businesses and consumers have direct access to all manner of documents and media. In addition, Hypertext Markup Language (HTML), which had been the documentation language of the internet World Wide Web for years offered direct links between pages and other documentation on the Web and a variety of related data sources which were at first text and then evolved into media, i.e. "hypermedia". This even further exploded the use of the internet or World Wide Web. It was now possible for the Web browser or wanderer to spend literally hours going through document after document and accompanying media events in often less than productive excursions through the Web. These excursions often strained the users' time and resources. In order for the internet to mature from its great expectations to solid commercial fruition, it will be necessary for the internet to greatly reduce its drain on time and related resources or to provide greater communication bandwidth.

A significant source of this drain is in the Web page, the basic document page of the Web. In the case of Web pages, we do not have the situation of a relatively small group of professional designers working out the human factors; rather in the era of the Web, anyone and everyone can design a Web page. As a result, pages are frequently designed by developers without imaging or graphic skills. Such inexperienced designers cannot be expected to be very efficient or economical in their allocation of image resources. Thus, the value of such images is often far outweighed by their drain on the receiver's resources and time. Many images require relatively great amounts of time to download at the receiving station. In addition, there appears to be an increasing amount of advertising on the Web wherein the seeker of information at times has to be subjected to "commercials", often in the time and resource taxing image formats.

The present invention provides a solution to this downloading problem by providing a universal or global library of images which the creator of display pages may use. Each of the selectable images is represented by a data identifier so that during the transmission and distribution of the pages only the identifiers need be downloaded.

SUMMARY OF THE INVENTION

The present invention relates to a computer controlled display system for displaying documents, and particularly for displaying Web pages and related documentation on receiving display workstations in a computer managed communication network. Users access these Web pages via a plurality of such data processor controlled interactive display stations which receive documents transmitted to said display stations from locations remote from said stations. Such documents include a sequence of at least one display screen page containing text and images. Display or Web pages are transmitted to a receiving display station on the network which contain the identifiers for selected universal images rather than the images. Thus, only the identifiers need to be downloaded at the receiving display station. A library of universal images and identifiers respectively representative of each of said images is provided and means associated with said receiving display station retrieve from the library the image represented by the identifiers so that the retrieved image is included in received page without being downloaded. Preferably, the receiving display station further includes a user interactive network browser which includes the means for retrieving said image from said library. The network preferably includes at least one network library server for fetching the library and for transmitting said library to said receiving display station. For the most effective results, there is a cache associated with said receiving display station for storing said received library whereby said browser may retrieve said image from the cache.

In a similar way, the library of universal images and identifiers is made available to the facilities at which the Web pages are created. The Web page is customarily being created at a computer controlled display terminal connected to the network via a conventional network server. The creation facility is provided with access to the library of images and identifiers so that it may retrieve the images which are selected for the Web page. Means are provided for transmitting the Web pages from the creation facility with said identifiers representative of said selected images in place of the images. In accordance with another aspect of the present invention, the above-mentioned network library server also operates to fetch said library and transmit said library to said display page creation facility. In addition, there may be a cache associated with said display page creation facility for storing said received library whereby said facility may retrieve said image and identifiers from said cache.

It should be noted that the images being transmitted in the present invention also include symbols.

DETAILED DESCRIPTION OF THE PREFERRED EMBODIMENT

Before going into the details of specific embodiments, it will be helpful to understand from a more general perspective the various elements and methods which may be related to the present invention. Since a major aspect of the present invention is directed to documents such as Web pages transmitted over networks, an understanding of networks and their operating principles would be helpful. We will not go into great detail in describing the networks to which the present invention is applicable since this information is well known in our art. Reference has also been made to the applicability of the present invention to a global network such as the internet. For details on internet nodes, objects and links, reference is made to the text, *Mastering the Internet*, G. H. Cady et al., published by Sybex Inc. Alameda, Calif., 1996.

Any data communication system which interconnects or links computer controlled systems with various sites defines a communications network. A network may be as simple as two linked computers or it may be any combination of LANS (Local Area Networks) or WANS (Wide Area Networks). Of course, the internet or World Wide Web is a global network of a heterogeneous mix of computer technologies and operating systems. Higher level objects are linked to the lower level objects in the hierarchy through a variety of network server computers. These network servers are the key to network distribution such as the distribution of Web pages and related documentation. The HTML language, which is the basic language of Web pages, is described in detail in "Just Java", 2nd Edition, Peter van der Linden, Sun Microsystems, 1997, particularly at Chapter 7, pp. 249-268 and also in the text, "Mastering the Internet", Cady and McGregor, published by Sybex, San Francisco, 1996, particularly at pp. 637-642 on HTML in the formation of Web pages. In addition, significant aspects of this invention will involve Web browsers. A general and comprehensive description of browsers may be found in the above-mentioned Cady et al. text at pp. 291-313.

Figure 1:
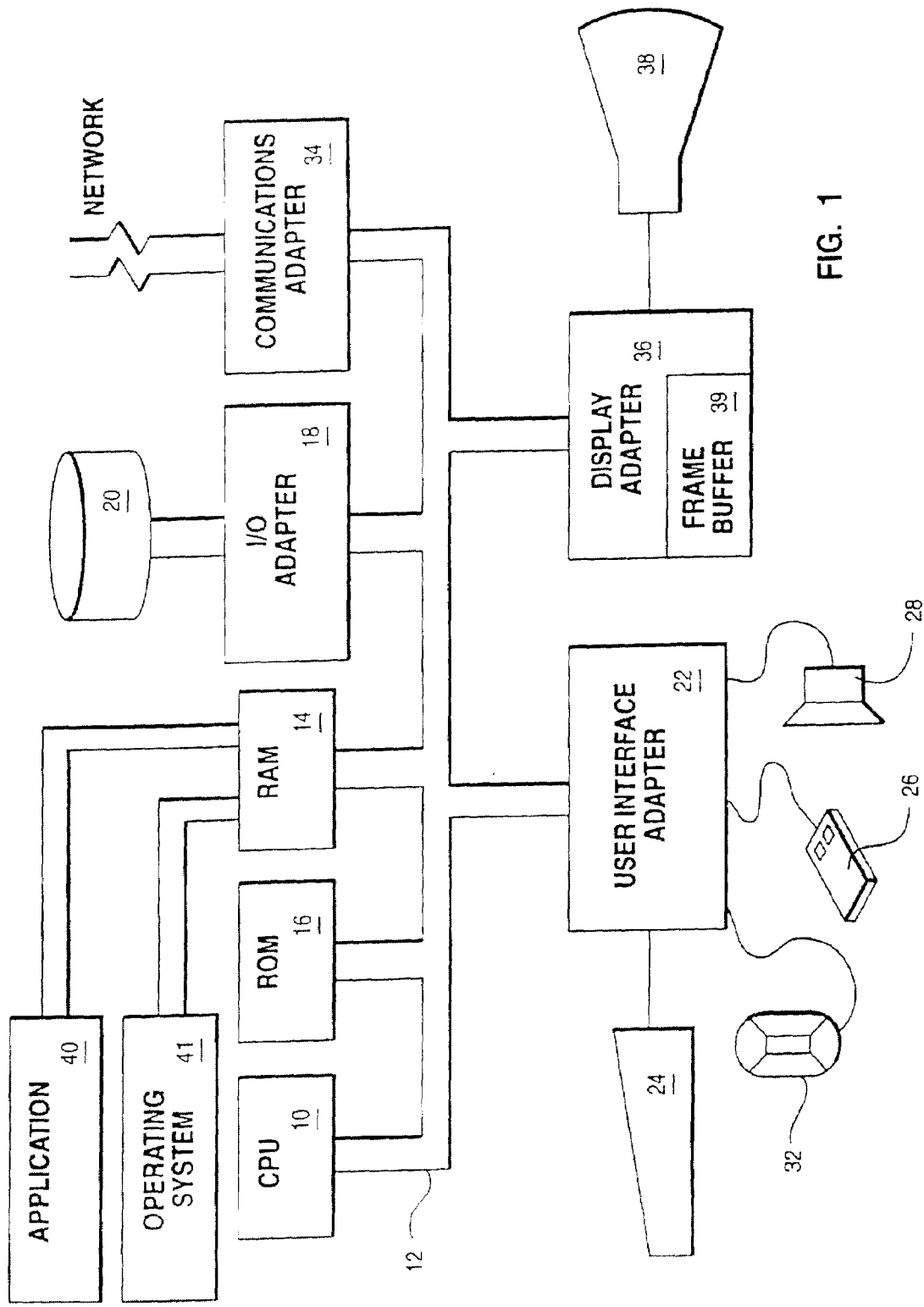
FIG. 1 is a block diagram of a data processing system including a central processing unit and network connections via a communications adapter which is capable of implementing a user interactive workstation on which the received data may be converted into a Web page in accordance with the present invention.

Referring to FIG. 1, a typical data processing system is shown which may be used in conjunction with HTML in implementing the present invention on the receiving interactive workstation. A central processing unit (CPU), such as one of the PowerPC microprocessors available from International Business Machines Corporation (PowerPC is a trademark of International Business Machines Corporation), is provided and interconnected to various other components by system bus 12. An operating system 41 runs on CPU 10 and provides control and is used to coordinate the function of the various components of FIG. 1. Operating system 41 may be one of the commercially available operating systems such as the OS/2 operating system available from International Business Machines Corporation (OS/2 is a trademark of International Business Machines Corporation) or the Windows95 system (a trademark of and available from Microsoft Corporation). Any conventional network browser system involving HTML language and modified as described in accordance with present invention forms part of application 40, runs in conjunction with operating system 41 and provides output calls to the operating system 41 which implements the various functions to be performed by the HTML application 40 which includes HTML applications as well as the browser program which operates in combination with the program of the present invention. The program of this invention could desirably be incorporated into the browser program.

The browser program, in combination with the operating system, provides the basic receiving workstation on which the Web pages are received and on which the program of the present invention may be implemented to translate the image identifiers in the received page and to retrieve the corresponding images from the universal image library.

It should be noted that while the basic data processing system of FIG. 1 has been described with respect to a receiving workstation function, it may also function as the workstation on which the Web pages may be created. The page creation function will be subsequently discussed. With respect to the receiving workstation operation, a read only memory (ROM) 16 is connected to CPU 10, via bus 12 and includes the basic input/output system (BIOS) that controls the basic computer functions. Random access memory (RAM) 14, I/O adapter 18 and communications adapter 34 are also interconnected to system bus 12. It should be noted that software components, including the operating system 41 and the browser as modified in accordance with the present invention as application 40, are loaded into RAM 14, which is the computer system's main memory. I/O adapter 18 may be a small computer system interface (SCSI) adapter that communicates with the disk storage device 20, i.e. a hard drive. Communications adapter 34 interconnects bus 12 with an outside network enabling the workstation to communicate with Web servers to receive document pages over a local area network (LAN) or wide area network (WAN) which includes, of course, the internet or World Wide Web. I/O devices are also connected to system bus 12 via user interface adapter 22 and display adapter 36. Keyboard 24, trackball 32, speaker 28 and mouse 26 are all interconnected to bus 12 through user interface adapter 22. Display adapter 36 includes a frame buffer 39 which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting data and other information to the system through the trackball 32 or mouse 26 to make his preselections of file types to be and not to be transmitted from the server and for receiving the transmitted file types and other output information from the system via display 38.

Figure 2:
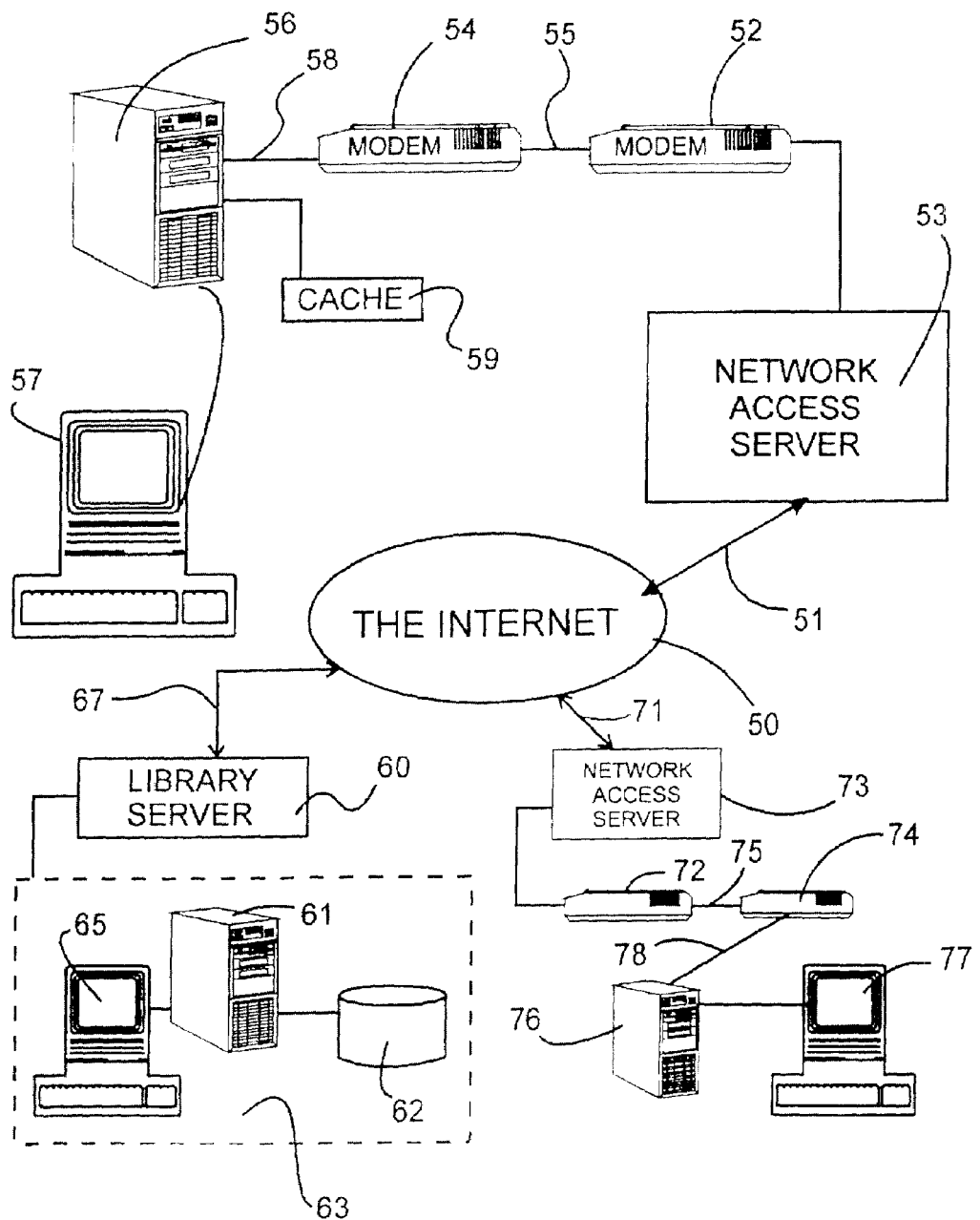
FIG. 2 is a generalized diagrammatic view of an internet portion upon which the present invention may implemented.

A generalized diagram of a portion of an internet to which the computer 56 controlled display terminal 57, used for Web page receiving and display of the present invention, is connected as shown in FIG. 2. Computer 56 and display terminal 57 are the computer system shown in FIG. 1 and connection 58 (FIG. 2) is the network connection shown in FIG. 1. Reference may be made to the above-mentioned text, *Mastering the Internet*, Cady et al., particularly at pp. 136-147, for typical connections between local display workstations to the internet via network servers, any of which may be used to implement the system on which this invention is used. The system embodiment of FIG. 2 is one of these known as a host-dial connection. Such host-dial connections have been in use for over 30 years through network access servers 53 which are linked 51 to the net 50. The servers 53 are maintained by a service provider to the client's display terminal 57. The host's server 53 is accessed by the client terminal 57 through a normal dial-up telephone linkage 58 via modem 54, telephone line 55 and modem 52. The HTML files representative of the Web pages are downloaded to display terminal 57 through controlling server 53 and computer 56 via the telephone line linkages from server 53 which may have accessed them from the internet 50 via linkage 51.

For the present illustrative embodiment, we will describe a basic system wherein a Web page created at a remote station: computer 76 controlled display terminal 77 is transmitted over the internet 50 to receiving display 57. The transmitting terminal 77 may be connected to the internet 50 via a host-dial connection system similar to that of terminal 57. Access servers 73 which are linked 71 to the net 50. The servers 73 are maintained by a service provider to the Web page provider's display terminal 77. The host's server 73 is accessed by the client provider terminal 77 through a normal dial-up telephone linkage 78 via modem 74, telephone line 75 and modem 72. The HTML files representative of the Web pages are downloaded from display terminal 77 and computer through controlling server 73 and computer 76 via the telephone line linkages from server 73 transmitted them to the internet 50 via linkage 71. The Web pages created by and transmitted from terminal 77 are set up so that the transmitted HTML files representative of the pages will have each of a plurality of their images respectively represented by an identifier. These images will have been selected by the interactive user constructing the Web pages from a universal library of images and corresponding identifiers. The universal library 63 is shown as made up of a controlling computer 61 and the database 62 of the images and display terminal 65 for I/O to library 63. It may be connected to the internet via library server 60 and linkage 67. If the Web page creation terminal 77 is a page design center where significant numbers of pages are designed, it may be most efficient for the terminal to have the library of universal images or a portion of the library stored at the terminal, e.g. as a CD ROM connected via computer 76, or the library may be cached at the terminal in a manner similar to that to be described with respect to receiving terminal 57. During Web page creation, the provider of the pages, whenever possible, looks to the library of universal images for his images, portions of images and symbols. Thus, when the Web page is transmitted, its HTML file has many identifiers representative of images and symbols.

Dependent upon the frequency of need to convert the identifiers, i.e. frequency of receiving Web pages, the receiving terminal 57 may also have a CD ROM with the universal library connected through its computer 56. However, effective results may be achieved by having terminal 57 access library 63 through the internet, its server 53 and library server 60 and download the library or an appropriate portion of the library in a local cache 59 receiving terminal which may be accessed via its computer 56. The cache may conveniently be one associated with the browser program through which the present invention is carried out. One such browser associated cache which may be used is described in copending commonly assigned patent application, "Shared Page Caching at Browsers for An Internet Related Application", G. T. Hunt et al., Ser. No. 08/936,219. Retrieval of information on the internet is conventionally done using an HTML compatible browser, an application program for requesting and accessing information from the internet. As shown above, the request is submitted through the network server 53 and identified as an URL (Uniform Resource Locator) and may be handled by a series of servers, e.g. library server 60 before the requested information is retrieved. The information is provided to the receiving display station or client in a HTML format. An alternative to the shared cache arrangement described above, would be just a local cache associated with the Web page receiving display. The advantage of having cache 59 of FIG. 2 function as a local cache would be that the cache could be tailored to meet the needs of the local receiving display station. Images and particularly symbols needed repetitively could be retrieved from universal libraries but then stored locally irrespective of their source libraries so that they would be available to be retrieved whenever their IDs or tags were received in a Web page at the station. As Web pages with repetitive images and symbols would be received at a receiving station over a period of time, the cache database of repetitively used images and symbols would increase accordingly, thereby improving downloading performance with usage.

All standard browsers are capable of local caching. While some form of caching is preferred, the manner of caching is not key to this invention. It is important to have an arrangement for having the library readily accessible at the local receiving station. The key is to have the universal images available at the receiving display stations so that time need not be consumed downloading the image each time that it is used in a page.

Before proceeding with specific software embodiments, some additional background information should be considered. Because of the ease and availability of Web browsers, an almost unimaginable number and variety of pages and topics are available at low cost to tens of millions of users. Unlike other database access systems, everyone on the Web has the ability to design a Web page. As a result, pages are frequently designed by developers without usability skills. The present invention, as set forth hereinabove, avoids needless excessive downloading and browsing time spent dealing with unnecessarily complex images.

The present invention is preferably implemented on the net browser in combination with standard browser functions. A graphical user interface is provided within the browser through which the user requests the Web page. Then the browser will control the functions to be subsequently described.

Figure 3:
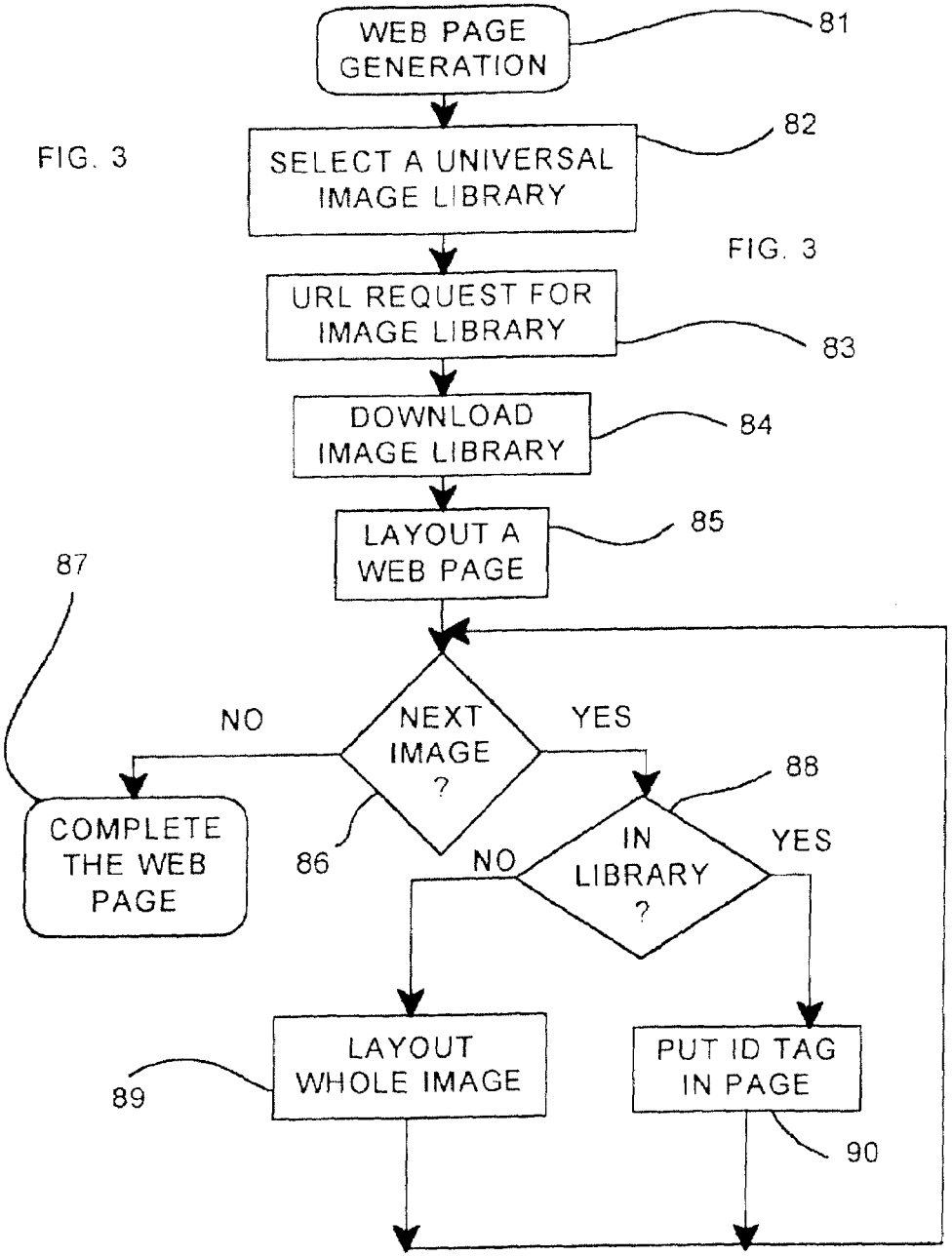
FIG. 3 is a flowchart of a program which may be used to generate a Web page having identifiers referencing images in a universal library of images.
Figure 4:
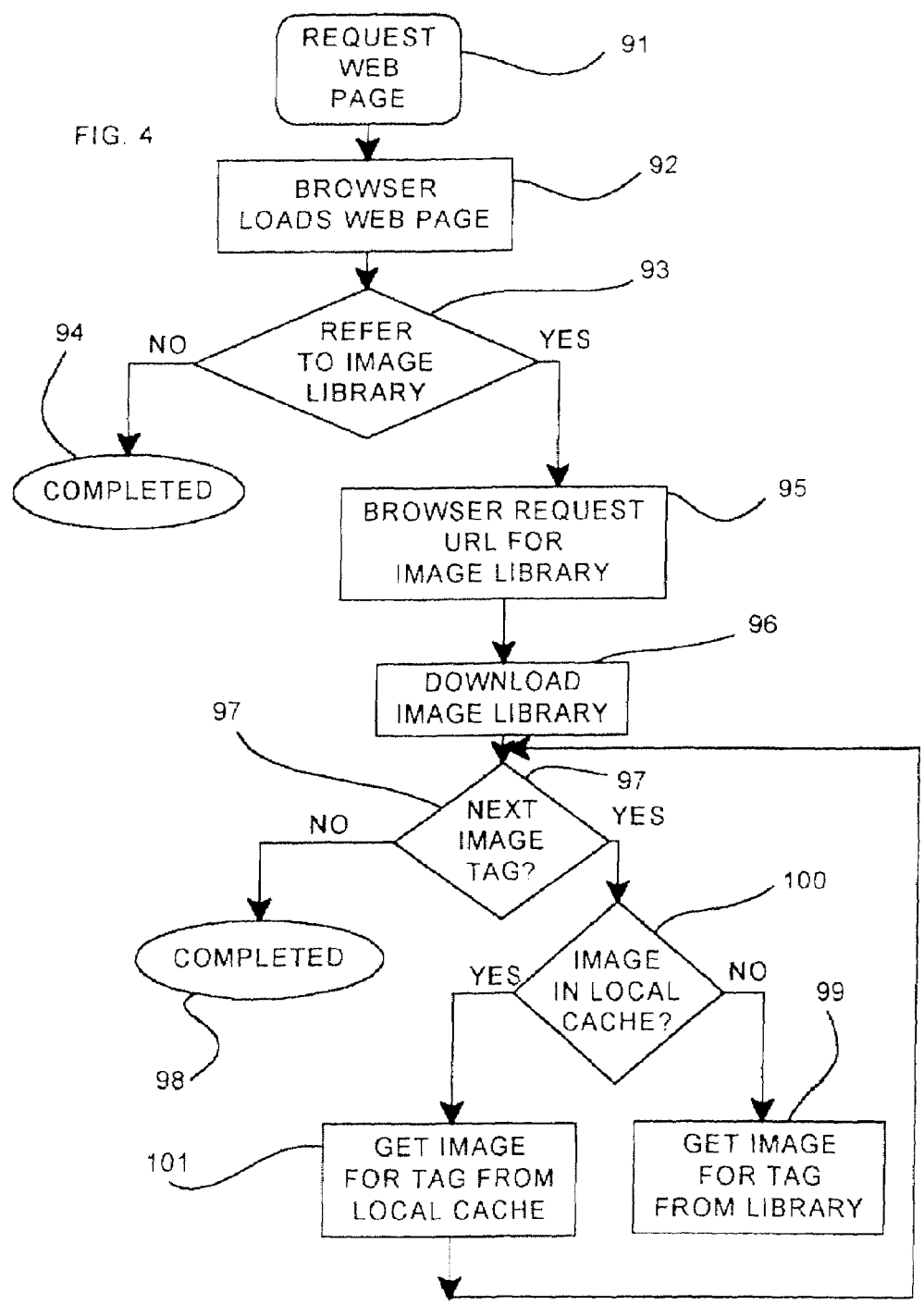
FIG. 4 is a flowchart of a program which may be used at a receiving display station of the received Web page of FIG. 3 to retrieve the universal image library and to construct the Web page by converting the identifiers into their corresponding images from the retrieved library.

The advantages of the present invention may be readily seen with respect to FIGS. 3 and 4. FIG. 3 is a flowchart of a program which may be used to generate a Web page having identifiers referencing images in a universal library of images. The Web page is developed on computer 76 controlled display terminal of FIG. 2. The Web page generation is commenced, step 81, FIG. 3. A library of universal images must be selected, step 82. In order to attain maximum effectiveness, a library must be selected which is both widely used and readily accessible to Web page users. As previously noted, the library may be available through the internet, such as library 63, FIG. 2, which is accessed via library server 60 or the library may be stored locally, e.g. a CD ROM on computer 76. In the present example, step 83, the library 63 is retrieved from the internet by an appropriate URL request. The retrieved library is downloaded, step 84, at the display station computer 76 and the layout of the Web page is commenced, step 85. It will be understood that the designer of the Web pages should select a library which is preferably usable on most, if not all, of the Web pages which he is to layout. As the layout of the Web page proceeds, a determination is made as to whether there is an initial or next image, step 86, FIG. 5. If No, then the Web page should be completed without the present program, step 87. If Yes, there is a next image, then, step 88, a determination is made as to whether the proposed image may be found in the library. If Yes, then the corresponding identifier for the image in the library is put at the image position as a tag in the HTML file representing the Web page, step 90. If No, the image or a reasonable facsimile of it cannot be found in the library, then, step 89, the page designer has to layout the image in a conventional manner. Hopefully, the latter situation does not happen too often as conventional images substantially increase download time of transmitted Web pages. In any event, after steps 89 or 90, the program returns to step 86 where a determination is made as to whether there is a next image until the page is completed. The completed page is now available to a requesting receiving display station via the internet, in response to which the page will be transmitted through network access server 73.

Now with reference to FIG. 4, there will be described how a requesting display station such as computer 56 controlled display station 57 upon receiving the Web page of FIG. 3 retrieves the universal image library and constructs the Web page by converting the identifiers into their corresponding images from the retrieved library. The program of the present invention may be desirably incorporated in any conventional browser program such as Internet Explorer or Netscape. The display station in FIG. 2 is made up of display 57 controlled by computer 56 which has a browser such as Netscape or Internet Explorer modified in accordance with this invention. Thus, FIG. 4, the user, via the browser, requests a Web page, step 91. The Web page is obtained and downloaded in the standard way, step 92, but it contains image identifiers or tags representative of images in a universal image library. Thus, the received page will refer to the appropriate library from which the tags may be converted. The determination from step 93 will be Yes and the browser program will develop the appropriate request URL, step 95, to retrieve the universal library, e.g. the data from library 63, FIG. 2, which will be downloaded in cache 59 in accordance with step 96, FIG. 4. If the determination from step 93 had been No, then this aspect of the page construction process would have been complete, step 94, and the page could be continued to be constructed in any conventional manner. Now the conversion of the tags in the Web page file is commenced. At each stage, a determination is made, step 97, as to whether there is an initial or next image tag. If Yes, then, step 100, a further determination may be made as to whether the image or symbol is already in the local cache based on previous use. If Yes, then the image is obtained from the local cache, step 101. If No, then, step 99, the tag would be converted into its corresponding image from the library which was downloaded in step 96. After either step 101 or 99, the process flow would be returned to step 97 to be continued until the decision from step 97 is No, at which stage all of the images on the page would have been converted from their respective tag identifiers.

Although certain preferred embodiments have been shown and described, it will be understood that many changes and modifications may be made therein without departing from the scope and intent of the appended claims.

The invention claimed is:

1. In a computer managed communication network with user access via a plurality of data processor controlled interactive display stations and with a system for displaying documents transmitted to said display stations from locations remote from said stations, said documents including a sequence of at least one display screen page including images, the improvement comprising:
   means for transmitting to a receiving one of said display stations, a page comprising at least one identifier representative of a universal image,
   a library of universal images and identifiers respectively representative of each of said images at a location remote from said receiving display station,
   a network library server for fetching said library and for transmitting said library to said receiving display station, and
   means associated with said receiving display station for retrieving from said library the image represented by said one identifier, whereby said retrieved image is included in said page.

2. The communications network of claim 1 wherein said receiving display station further includes a user interactive network browser, said browser including said means for retrieving said image from said library.

3. The communications network of claim 2, further including a cache associated with said receiving display station for storing said received library whereby said browser may retrieve said image from said cache.

4. The communications network of claim 1 wherein said universal images are images of symbols.

5. The communications network of claim 1 further including a facility for the creation of said display screen pages wherein said library server also operates to fetch said library and transmit said library to said display page creation facility, said facility comprising:
   means for retrieving images and identifiers from said library of universal images,
   means for incorporating selected images into said pages, and
   means for transmitting said pages with said identifiers representative of said selected images in place of the images.

6. The communications network of claim 5, further including a cache associated with said display page creation facility for storing said received library whereby said facility may retrieve said image and identifiers from said cache.

7. In a computer managed communication network with user access via a plurality of data processor controlled interactive display stations and with a system for displaying documents transmitted to said display stations from locations remote from said stations, said documents including a sequence of at least one display page containing text and images, a method for facilitating the creation and transmission of said images comprising:
   transmitting to a receiving one of said display stations, a page comprising at least one identifier representative of a universal image,
   providing a library of universal images and identifiers respectively representative of each of said images at a location remote from said receiving display station,
   fetching said library and transmitting said library to said receiving display station, and
   retrieving at said receiving display station the image represented by said one identifier from said library, whereby said retrieved image is included in said received page.

8. The method of claim 7 further including a network browsing method carried out on said receiving display station, said browsing method including said step of retrieving said image from said library.

9. The method of claim 7, further including the step of caching the received library at said receiving display station whereby said image may be retrieved from said cache.

10. The method of claim 7 wherein said universal images are images of symbols.

11. The method of claim 7 further including a procedure for the creation of said display screen pages comprising:
   accessing said library of universal images,
   retrieving images and identifiers from said library of universal images,
   incorporating selected images into said pages, and
   transmitting said pages with said identifiers representative of said selected images in place of the images.

12. The method of claim 11 wherein said creation of said display pages includes the further step of caching said library whereby the library is available for the page creation.

13. In a computer program having data structures included on a computer readable medium for browsing a computer managed communication network via a data processor controlled user interactive receiving display station in order to display on said receiving display station, documents transmitted to said station from network locations remote from said receiving station, each document including a sequence of at least one display screen page containing text and images, the improvement comprising:

means for receiving at said receiving display station, a page comprising at least one identifier representative of a universal image, means for fetching and transmitting to said receiving station from a remote location on said network, a library of universal images and identifiers respectively representative of each of said images, and means for retrieving from said library the image represented by said one identifier, whereby said retrieved image is included in said page.

14. The computer program for browsing according to claim 13 wherein the means for accessing said library includes means for receiving at said display station, said library transmitted from a network library server.

15. The computer program for browsing according to claim 14, further including a cache at said receiving display station for storing said received library whereby said image may be retrieved from said cache.

* * * * *